(12) United States Patent
Yabuuchi et al.

(10) Patent No.: US 10,862,359 B2
(45) Date of Patent: Dec. 8, 2020

(54) ROTOR, MOTOR, AIR-CONDITIONING APPARATUS, AND METHOD FOR MANUFACTURING ROTOR

(71) Applicant: Mitsubishi Electric Corporation, Tokyo (JP)

(72) Inventors: Hironori Yabuuchi, Tokyo (JP); Shinji Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 263 days.

(21) Appl. No.: 15/763,202

(22) PCT Filed: Nov. 26, 2015

(86) PCT No.: PCT/JP2015/083221
§ 371 (c)(1),
(2) Date: Mar. 26, 2018

(87) PCT Pub. No.: WO2017/090149
PCT Pub. Date: Jun. 1, 2017

(65) Prior Publication Data
US 2018/0278107 A1 Sep. 27, 2018

(51) Int. Cl.
*H02K 1/30* (2006.01)
*H02K 15/12* (2006.01)
(Continued)

(52) U.S. Cl.
CPC ............... *H02K 1/30* (2013.01); *F24F 1/38* (2013.01); *H02K 1/278* (2013.01); *H02K 7/14* (2013.01);
(Continued)

(58) Field of Classification Search
CPC ............ H02K 1/30; H02K 1/27; H02K 15/03; H02K 15/12; H02K 7/18; H02K 7/14; H02K 1/278; F24F 1/38
See application file for complete search history.

(56) References Cited

U.S. PATENT DOCUMENTS 6,144,130 A * 11/2000 Kawamura ............ H02K 1/278
310/156.12
8,659,199 B2 * 2/2014 Tokoi ................... H02K 1/2793
310/156.08
(Continued)

FOREIGN PATENT DOCUMENTS

CN 103155368 A 6/2013
JP 2000-125524 A 4/2000
(Continued)

OTHER PUBLICATIONS

Office action dated Jul. 2, 2019 issued in corresponding CN patent application No. 201580084711.4 (and English translation thereof).
(Continued)

*Primary Examiner* — Naishadh N Desai
(74) *Attorney, Agent, or Firm* — Posz Law Group, PLC (57) ABSTRACT

A rotor, a motor, an air-conditioning apparatus, and a method for manufacturing a rotor are provided with high productivity and reliability and with structural stability. The rotor includes a shaft, an inner core into which the shaft is inserted, an outer core provided on a radially outer side of the inner core and composed of a plurality of divided cores formed by stacking a plurality of thin plate materials and connected in an annular shape, and a coupling member made of resin, coupling the inner core and the outer core together, and covering both end faces of the outer core in an axial direction of the shaft. The outer core has radially outer parts of the divided cores brought into close contact with each other.

10 Claims, 10 Drawing Sheets (51) Int. Cl.
  *H02K 7/14* (2006.01)
  *F24F 1/38* (2011.01)
  *H02K 1/27* (2006.01)
  *H02K 7/18* (2006.01)
  *H02K 15/03* (2006.01)

(52) U.S. Cl.
  CPC ............. *H02K 7/18* (2013.01); *H02K 15/03* (2013.01); *H02K 15/12* (2013.01)

(56) References Cited

U.S. PATENT DOCUMENTS

| 8,952,590 | B2* | 2/2015 | Calley | B62M 6/65 |
| | | | | 310/216.008 |
| 2006/0119204 | A1* | 6/2006 | Awazu | H02K 1/2786 |
| | | | | 310/156.53 |
| 2013/0119806 | A1 | 5/2013 | Watanabe et al. | |
| 2016/0065011 | A1* | 3/2016 | Schneider | H02K 15/03 |
| | | | | 310/216.007 |

FOREIGN PATENT DOCUMENTS

| JP | 2006-187176 A | 7/2006 |
| JP | 2008-259359 A | 10/2008 |
| JP | 2015-056984 A | 3/2015 |
| JP | 2015-106928 A | 6/2015 |
| WO | 2012/120828 A1 | 9/2012 |

OTHER PUBLICATIONS

International Search Report dated Mar. 1, 2016 issued in corresponding international patent application No. PCT/JP2015/083221 (and English translation).

* cited by examiner

ROTOR, MOTOR, AIR-CONDITIONING APPARATUS, AND METHOD FOR MANUFACTURING ROTOR

CROSS REFERENCE TO RELATED APPLICATION

This application is a U.S. national stage application of PCT/JP2015/083221 filed on Nov. 26, 2015, the contents of which are incorporated herein by reference.

TECHNICAL FIELD

The present invention relates to a rotor including a coupling member coupling an inner core and an outer core together, a motor, an air-conditioning apparatus, and a method for manufacturing a rotor.

BACKGROUND ART

Conventionally, in the field of schemes for forming the rotor of a motor, there has been known a stacking scheme for forming the rotor of a motor by stacking thin plate materials that are pressed materials punched out by press working. The stacking scheme is widely used to form the rotor of an SPM motor, an IPM motor, or an outer rotor.

The rotor is formed of metals. In particular, the rotor has its core back formed of an electromagnetic steel sheet, as the core back is a part that forms a magnetic force and the electromagnetic steel sheet is less affected by an iron loss. However, even the use of the electromagnetic steel sheet cannot prevent the generation of an eddy current loss by a magnetic field. This makes it difficult to from the rotor without executing stacking.

In forming a rotor under the stacking scheme, a technique is used by which, for example, to form thin plate materials in an annular rotor shape by press working, stack the thin plate materials thus formed, and fix the thin plate materials (see, for example, Patent Literature 1).

Further, there has been known a technique by which to form thin plate materials in shapes into which a rotor is divided, form divided cores by stacking the thin plate materials, connecting the divided cores into an annular shape (see, for example, Patent Literature 2).

Patent Literature 1 discloses a method for, in order to reduce warpage of teeth formed in a stator core, injecting resin into a mold while supporting the near-center parts of the teeth with a support with which the mold is provided.

Further, Patent Literature 2 discloses a molding method for integrating a rotor core composed of divided cores, a frame, and permanent magnets. Specifically, such a method is employed that two permanent magnets stacked in a cross-sectional semicircular shape are inserted into each of a plurality of holes provided in the rotor core and a molding tool is used to inject resin through a resin through-hole provided in the frame.

CITATION LIST

Patent Literature

Patent Literature 1: Japanese Unexamined Patent Application Publication No. 2000-125524
Patent Literature 2: Japanese Unexamined Patent Application Publication No. 2008-259359

SUMMARY OF INVENTION

Technical Problem

However, in such a case as Patent Literature 1 where stator-shaped thin plate materials are formed by being punched out from a rectangular slit material, many parts of the slit material remain as remnants. This leads to lower yields and higher costs, undesirably resulting in low productivity.

Meanwhile, in such a case as Patent Literature 2 where a rotor core is formed by connecting divided cores, a deviation in thickness of thin plate materials causes the divided cores to be nonuniform in stacking thickness and this nonuniformity makes it impossible to uniformly cover the surfaces of the divided cores in performing integral molding with resin. This leads to lower yields, undesirably resulting in low productivity.

Further, in the case of a structure such as that of Patent Literature 2, permanent magnets are inserted into divided cores in connecting the divided cores. This undesirably forms gaps in connection between the divided cores, thus making the rotor unable to exhibit the required roundness. In a case where the rotor is out of roundness, disturbances of the magnetic flux lead to unbalanced magnetic attractive forces that cause reliability problems such as increases in vibrations and cogging sounds.

Further, the motors of Patent Literatures 1 and 2 undesirably have no guaranteed reliability, as they are not insulated for the prevention of electrolytic corrosion of the rotors.

The present invention has been made to solve the foregoing problems, and it is an object of the present invention to provide a rotor, a motor, an air-conditioning apparatus, and a method for manufacturing a rotor with high productivity and reliability and with structural stability.

Solution to Problem

A rotor according to an embodiment of the present invention includes a shaft, an inner core into which the shaft is inserted, an outer core provided on a radially outer side of the inner core and composed of a plurality of divided cores formed by stacking a plurality of thin plate materials and connected in an annular shape, and a coupling member made of resin, coupling the inner core and the outer core together, and covering both end faces of the outer core in an axial direction of the shaft. In the rotor, the outer core has radially outer parts of the divided cores brought into close contact with each other.

A motor according to an embodiment of the present invention includes the rotor and a stator disposed on a radially outer side of the rotor.

An air-conditioning apparatus according to an embodiment of the present invention includes the motor, a fan that is driven by the motor, and a heat exchanger that exchanges heat between air and refrigerant with a current of air produced by the fan.

A method for manufacturing a rotor according to an embodiment of the present invention is a method for manufacturing a rotor including a shaft, an inner core into which the shaft is inserted, an outer core provided on a radially outer side of the inner core and composed of a plurality of divided cores formed by stacking a plurality of thin plate materials and connected in an annular shape, and a coupling member made of resin, coupling the inner core and the outer core together, and covering both end faces of the outer core in an axial direction of the shaft. The method includes a molding step of molding the coupling member from resin. In the method, the molding step includes pressing an outer circumferential part of the outer core against an inner circumferential surface of a mold under resin pressure at which to mold the coupling member from the resin and thereby bringing radially outer parts of the divided cores into close contact with each other.

Advantageous Effects of Invention

According to the rotor, the motor, the air-conditioning apparatus, and the method for manufacturing a rotor according to the embodiments of the present invention, since the outer core is provided by connecting, into an annular shape, the plurality of divided cores formed by stacking a plurality of thin plate materials, fewer parts remain as remnants. This leads to higher yields and lower costs, resulting in high productivity.

Further, since the coupling member covers both end faces of the outer core in the axial direction of the shaft, the surfaces of the divided cores can be uniformly covered. This leads to higher yields, resulting in high productivity.

Furthermore, since the radially outer parts of the divided cores are brought into close contact with each other, permanent magnets can be disposed at equal intervals on the outer core so that the rotor can exhibit the required roundness. Therefore, since the rotor exhibits its roundness, there are no disturbances of the magnetic flux. The absence of disturbances of the magnetic flux leads to balanced magnetic attractive forces that in turn lead to reductions in vibrations, cogging sounds, and the like, resulting in improved reliability.

Further, since the coupling member made of resin couples the inner core and the outer core together, the inner core and the outer core can be insulated by the coupling member made of resin. This prevents electrolytic corrosion between the inner core and the outer core, resulting in improved reliability.

All this makes it possible to give the rotor a stable structure and bring about improvement in productivity and reliability.

DESCRIPTION OF EMBODIMENTS

The following describes Embodiment of the present invention with reference to the drawings.

It should be noted that the drawings assigns the same reference signs to identical or equivalent constituent elements and these reference signs are adhered to throughout the Description.

Furthermore, the forms of the constituent elements described in the Description are mere examples and, as such, are not limited by these descriptions.

EMBODIMENT

Figure 1:
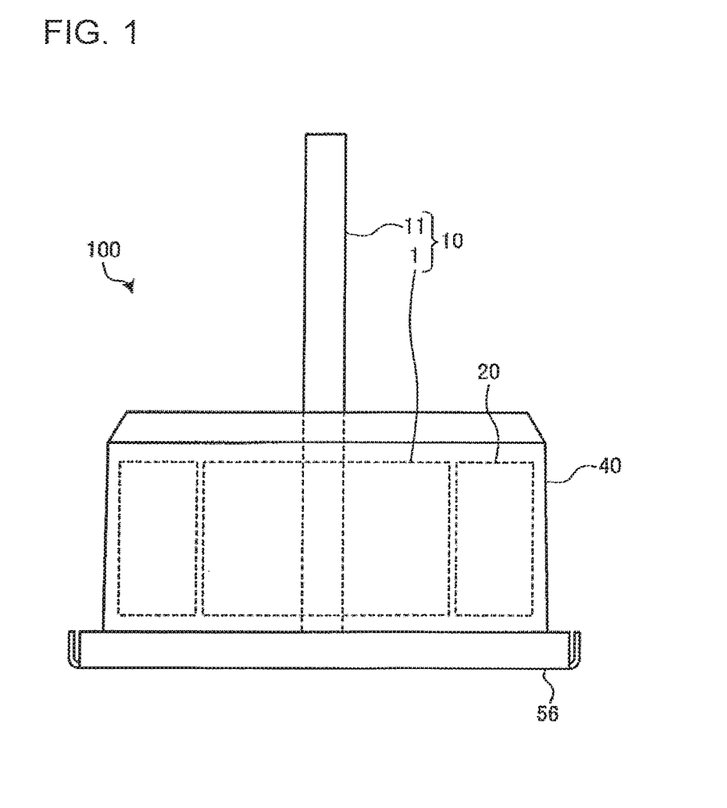
FIG. 1 is a side view of a motor according to Embodiment of the present invention.
Figure 2:
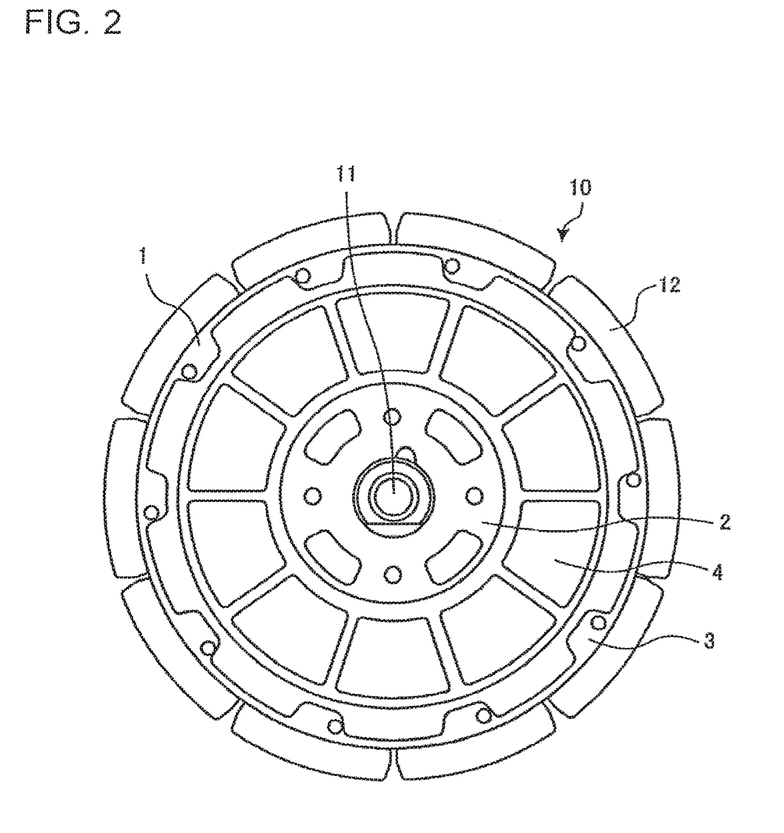
FIG. 2 is a top view of a rotor of the motor according to Embodiment of the present invention.
Figure 3:
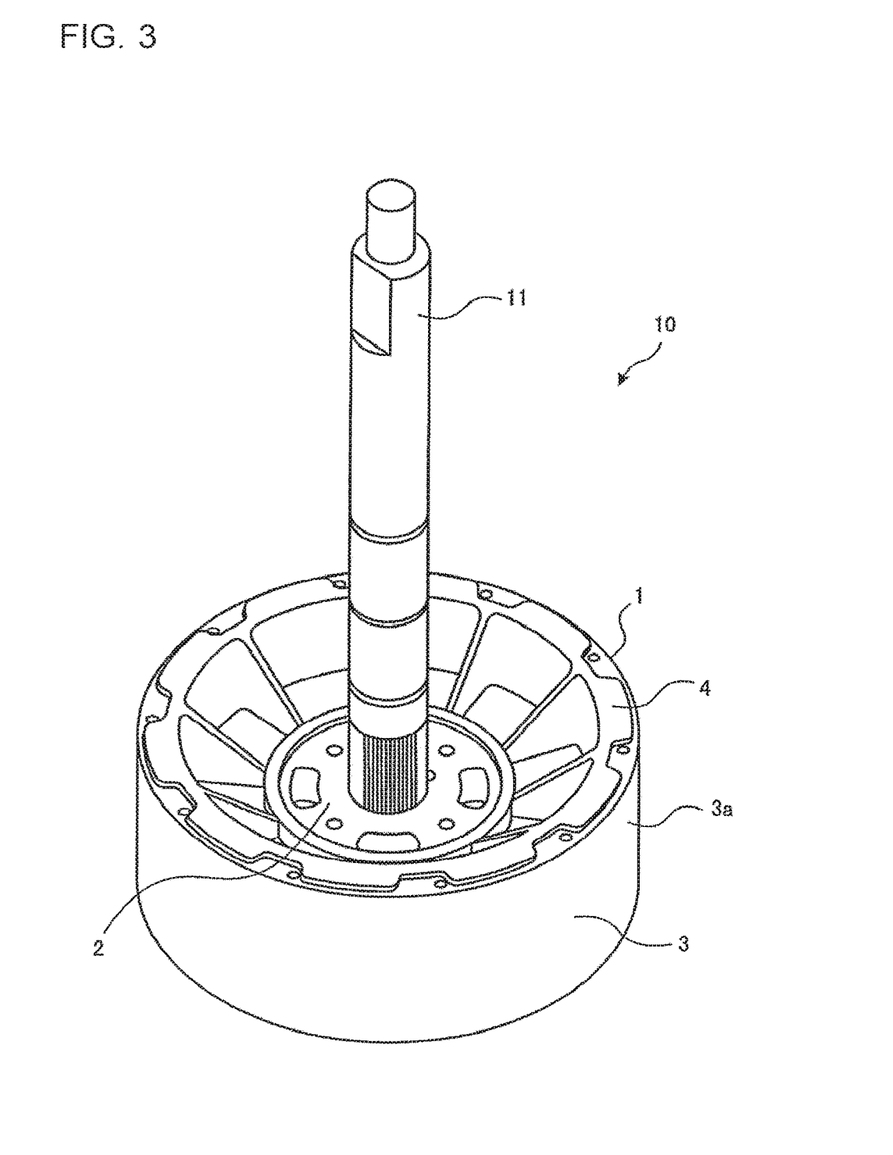
FIG. 3 is a perspective view of the rotor of the motor according to Embodiment of the present invention with permanent magnets removed from the rotor.

FIG. 1 is a side view of a motor 100 according to Embodiment of the present invention. FIG. 2 is a top view of a rotor 10 of the motor 100 according to Embodiment of the present invention. FIG. 3 is a perspective view of the rotor 10 of the motor 100 according to Embodiment of the present invention with permanent magnets 12 removed from the rotor 10.

As shown in FIGS. 1 to 3, the motor 100 includes a stator 20 with a coil (not illustrated) wound therearound, the rotor 10, which is rotatably placed on a radially inner side of the stator 20, and a body shell 40 molded from another resin to fix the stator 20.

The stator 20 is placed on a radially outer side of the rotor 10. The stator 20 includes a stator pole piece constructed by stacking a plurality of electromagnetic steel sheets, a winding wire through which an electric current supplied from a power source flows, and an insulator provided to the stator pole piece for use in insulation of the coil.

The rotor 10 includes a rotor body 1 and a shaft 11 coupled to the rotor body 1. The rotor body 1 is a rotor core. The rotor body 1 includes an inner core 2 serving as a boss, an outer core 3 serving as a yoke, and a coupling member 4 molded from resin to couple the inner core 2 and the outer core 3 together.

Further, the rotor 10 is provided with a bearing (not illustrated). The rotor 10 is disposed to have the same axis as the stator 20, which has a circular cylindrical shape. The shaft 11 is inserted in the inner core 2 of the rotor body 1.

Furthermore, the rotor 10 includes a plurality of permanent magnets 12 attached to an outer circumferential surface of the rotor body 1 and disposed at equal intervals.

The rotor 10 rotates due to repulsion between a magnetic field formed by the introduction of electric current to the coil wound around the stator 20 and the permanent magnets 12 disposed on the outer circumferential surface of the rotor 10. Note here that the rotor 10 with the permanent magnets 12 attached thereto is utilized, for example, as the rotor of an SPM motor.

Figure 4:
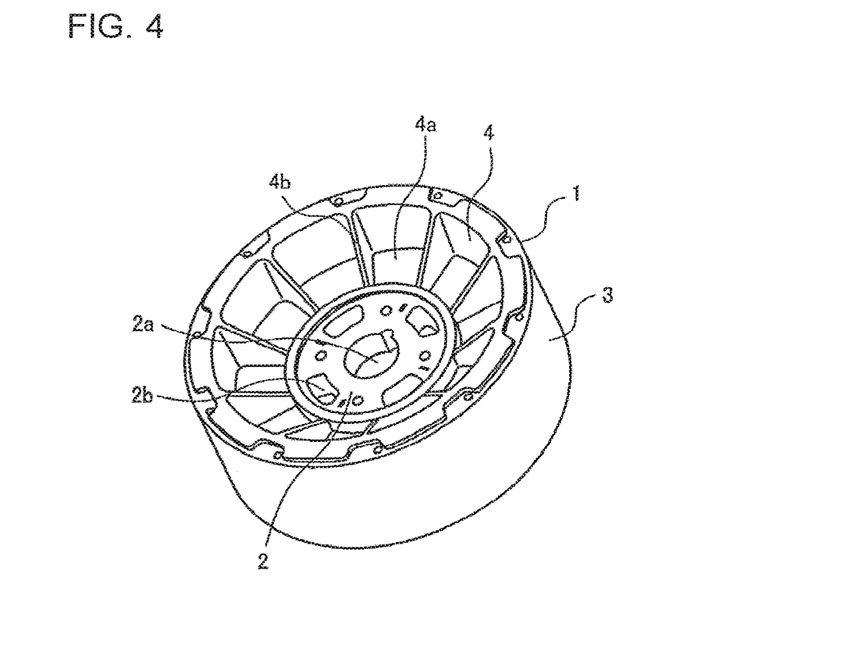
FIG. 4 is a perspective view of a rotor body as viewed from above the rotor of the motor according to Embodiment of the present invention.
Figure 5:
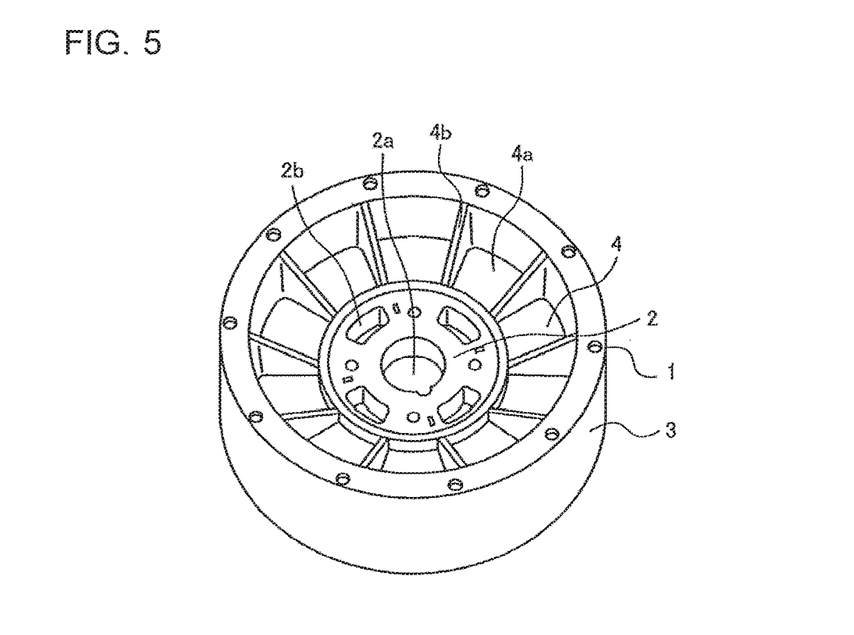
FIG. 5 is a perspective view of the rotor body as viewed from below the rotor of the motor according to Embodiment of the present invention.
Figure 6:
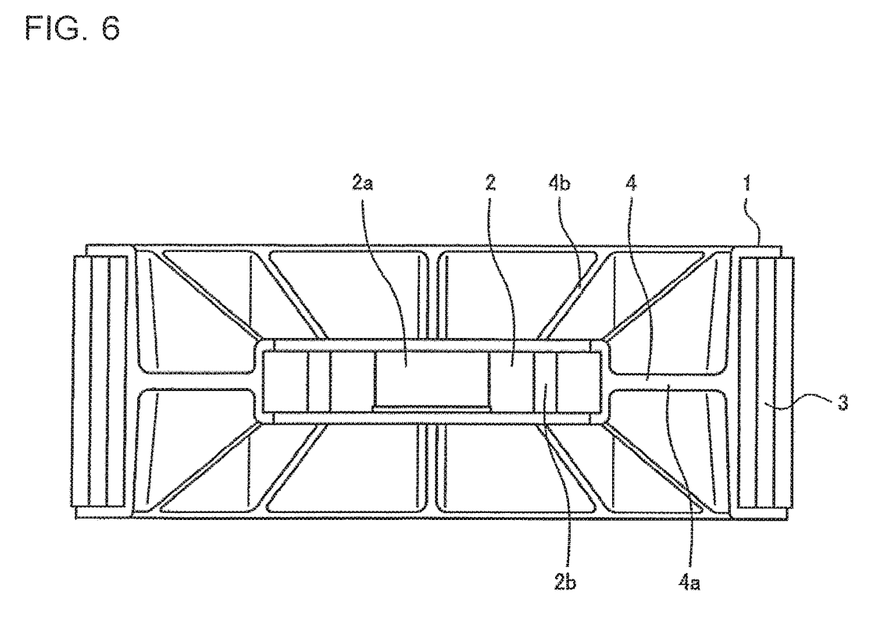
FIG. 6 is an explanatory diagram showing a cross-section of the rotor body of the rotor of the motor according to Embodiment of the present invention.

FIG. 4 is a perspective view of the rotor body 1 as viewed from above the rotor 10 of the motor 100 according to Embodiment of the present invention. FIG. 5 is a perspective view of the rotor body 1 as viewed from below the rotor 10 of the motor 100 according to Embodiment of the present invention. FIG. 6 is an explanatory diagram showing a cross-section of the rotor body 1 of the rotor 10 of the motor 100 according to Embodiment of the present invention.

The rotor body 1 includes the inner core 2 into which the shaft 11 is inserted, the outer core 3 provided on an radially outer side of the inner core 2 and composed of a plurality of divided cores 3a formed by stacking a plurality of thin plate materials and connected in an annular shape, and the coupling member 4 made of resin, coupling the inner core 2 and the outer core 3 together, and covering both end faces of the outer core 3 in an axial direction in which the shaft 11 extends out.

The inner core 2 is in the shape of a circular plate constituted by a single member and has in its center an insertion hole 2a through which the shaft 11 is inserted. Further, the inner core 2 has lightening holes 2b formed around the insertion hole 2a for weight reduction.

The outer core 3 includes the plurality of divided cores 3a connected in an annular shape and provided on the radially outer side of the inner core 2.

Each of the divided cores 3a includes a plurality of thin plate materials stacked on top of each other. Specifically, each of the divided cores 3a includes thin plate materials stacked up to the required height and fixed by caulking or the like.

The larger number of divided cores 3a the outer core 3 is composed of, i.e. the larger number of partitions the outer core 3 has, the closer the outer diameters of the circular arc divided cores 3a become to straight lines, so that the fewer parts of a rectangular slit material remain as remnants after the thin plate materials have been punched out from the rectangular slit material. This leads to higher yields. However, this also has a demerit of requiring time for assembly such as stacking and connection.

Further, in a case where such a configuration is adopted that dividing parts are provided as boundaries between the divided cores 3a on the surface on which the permanent magnets 12 are disposed, the dividing parts have air layers serving flux barriers that causes the dividing parts to have resistance of the magnetic flux. This leads to lower efficiency.

Therefore, the number of partitions of the outer core 3 needs only be determined according to a motor pole number such that, when the motor pole number is n, the number of partitions is n. For example, when the motor pole number is 4, the number of partitions is 4, and when the motor pole number is 6, the number of partitions is 6. Making the number of partitions of the outer core 3 equal to the motor pole number makes it possible to reduce the influence of the magnetic flux. In Embodiment, in which the motor pole number is 10, the number of partitions is 10 accordingly.

Further, if, in a case where the permanent magnets 12 are attached to the outer circumferential surface, the outer core 3 has steps on the surfaces of the dividing parts at which the divided cores 3a are connected, the steps may make it impossible to attach the permanent magnets 12 at sufficient adhesive strength. For this reason, it is preferable to make the number of partitions of the outer core 3 equal to the motor pole number as noted above and not to attach the permanent magnets 12 to the dividing parts.

The coupling member 4 is made of resin and includes a main annular portion 4a planarly coupling the inner core 2 and the outer core 3 together and triangular reinforcing ribs 4b reinforcing the inner core 2 and the outer core 3, which is greater in height than the inner core 2 in the axial direction of the shaft 11, at regular intervals. The main annular portion 4a covers both end face of the outer core 3 in the axial direction of the shaft 11. Ten of these reinforcing ribs 4b are provided in correspondence with the divided cores 3a so as to be located at the circumferential centers of the divided cores 3a, respectively.

Figure 7:
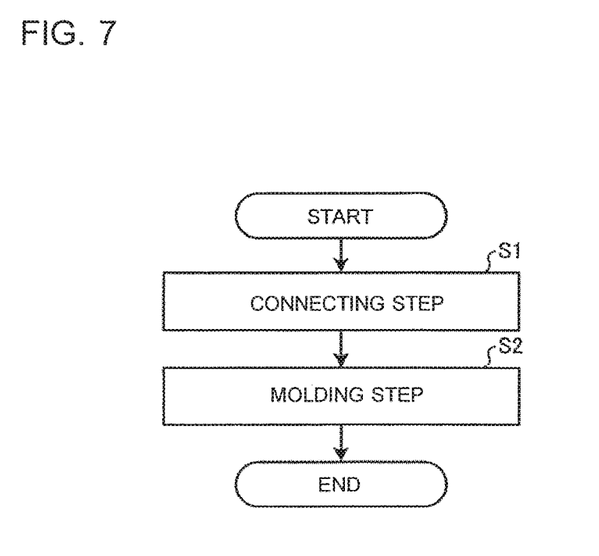
FIG. 7 is a flow chart showing a method for manufacturing a rotor body of a rotor of a motor according to Embodiment of the present invention.

FIG. 7 is a flow chart showing a method for manufacturing a rotor body 1 of a rotor 10 of a motor 100 according to Embodiment of the present invention.

The method for manufacturing a rotor body 1 includes a connecting step S1 and a molding step S2.

Figure 8:
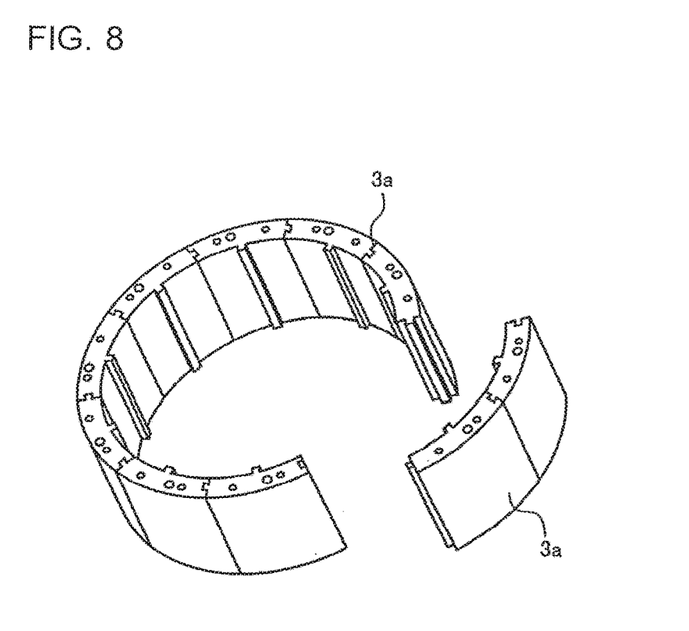
FIG. 8 is a diagram showing a state where divided cores of the rotor of the motor according to Embodiment of the present invention are being connected.
Figure 9:
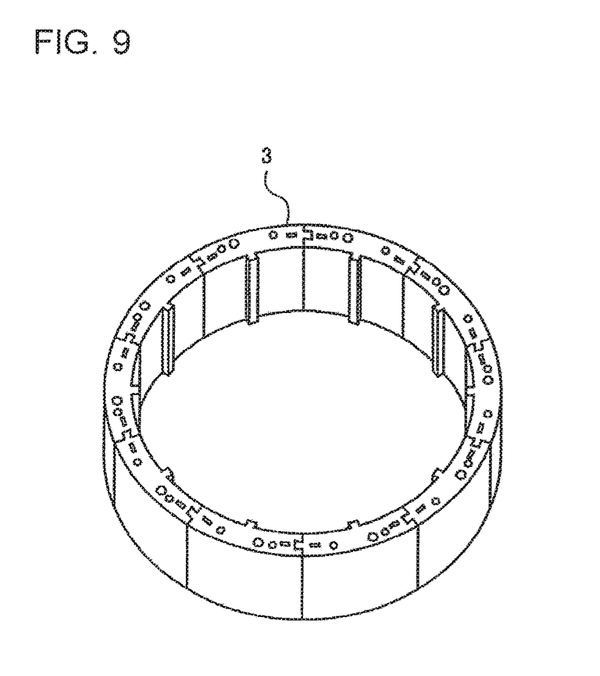
FIG. 9 is a diagram showing a state where an outer core has been constructed by connecting the divided cores of the rotor of the motor according to Embodiment of the present invention.

FIG. 8 is a diagram showing a state where the divided cores 3a of the rotor 10 of the motor 100 according to Embodiment of the present invention are being connected. FIG. 9 is a diagram showing a state where the outer core 3 has been constructed by connecting the divided cores 3a of the rotor 10 of the motor 100 according to Embodiment of the present invention.

In the connecting step S1, each of the divided cores 3a is placed one by one into a lower mold 200a of a mold 200 before molding, and the divided cores 3a are connected to each other as shown in FIG. 8. As shown in FIG. 9, the divided cores 3a thus connected form an annular shape to constitute the outer core 3.

Figure 10:
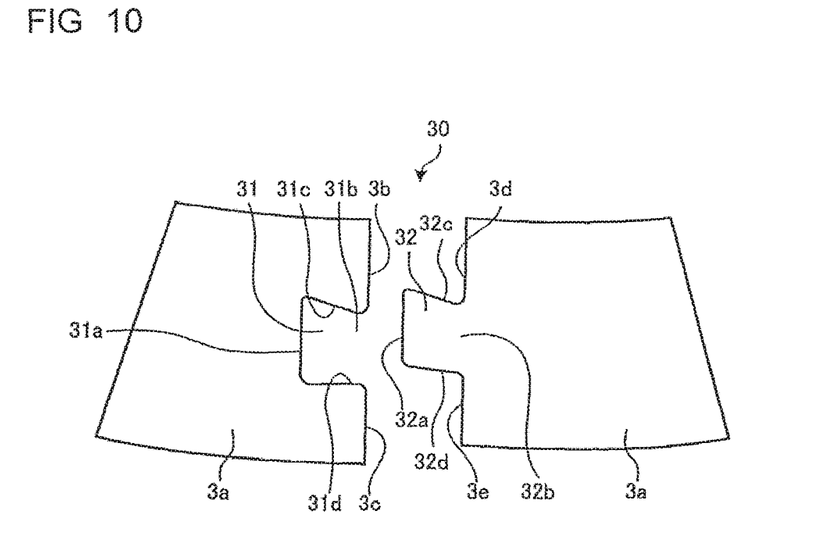
FIG. 10 is an enlarged view of a connection structure via which divided cores of the rotor of the motor according to Embodiment of the present invention are connected to each other.

FIG. 10 is an enlarged view of a connection structure 30 via which divided cores 3a of the rotor 10 of the motor 100 according to Embodiment of the present invention are connected to each other.

In the connecting step, the divided cores 3a connected to each other via a connection structure 30 formed at circumferential ends of each of the divided cores 3a. The connection structure 30 is formed at the radially central parts of the circumferential ends of the divided core 3a.

The connection structure 30 has a dovetail groove 31 formed at one circumferential end and a salient 32, formed at the other circumferential end, which is fitted into the dovetail groove 31.

The dovetail groove 31 is formed in the shape of a groove in a face of the outer core 3 that faces in the axial direction in which the shaft 11 extends out. The dovetail groove 31 has a bottom 31a and an opening 31b. The bottom 31a is larger than the opening 31b.

The dovetail groove 31 has a radially inner side 31c inclined at an angle of inclination with respect to a circumferential direction. Further, a radially inner end 3b, which is radially inner than the dovetail groove 31, is inclined at an angle of inclination with respect to a radial direction.

Meanwhile, the dovetail groove 31 has a radially outer side 31d extending out in the circumferential direction. A radially outer end 3c, which is radially outer than the dovetail groove 31, extends along the radial direction.

The salient 32 is formed in the shape of a projection in the face of the outer core 3 that faces in the axial direction in which the shaft 11 extends out. The salient 32 has a tip 32a and a base 32b. The tip 32a is larger than the base 32b.

The salient 32 has a radially inner side 32c inclined at an angle of inclination with respect to the circumferential direction in correspondence with the side 31c of the dovetail groove 31. Further, a radially inner end 3d, which is radially inner than the salient 32, is inclined at an angle of inclination with respect to the radial direction. Thus, differences in dimension are provided to form gaps between the side 31c of the dovetail groove 31 and the side 32c of the salient 32 and between the radially inner ends 3b and 3d than the connection structure 30.

Meanwhile, the salient 32 has a radially outer side 32d extending out in the circumferential direction in correspondence with the side 31d of the dovetail groove 31. A radially outer end 3e, which is radially outer than the salient 32, extends along the radial direction. Dimensions are designated for complete contact to make gapless close contact between the side 31d of the dovetail groove 31 and the side 32d of the salient 32 and between the radially outer ends 3c and 3e than the connection structure 30 when the divided cores 3a are pressed together against an inner circumferential surface 201 of the mold 200 as will be mentioned later. In this close-contact state, the outer core 3 is formed into an annular shape.

In the connecting step S1, the divided cores 3a are connected to each other by fitting the salient 32 into the dovetail groove 31.

It should be noted that since, in the connecting step S1, the salient 32 is simply fitted into the dovetail groove 31, the divided cores 3a are connected to each other with play in the lower mold 200a of the mold 200. This play facilitates assembly in connecting all of the divided cores 3a into an annular shape. Further, in a state where the salient 32 is fitted in the dovetail groove 31, the range of movement of the divided cores 3a is restricted so that the divided cores 3a are hardly disconnected from each other.

Further, after the connecting step S1, the inner core 2 is placed in a predetermined position in the lower mold 200a of the mold 200.

Figure 11:
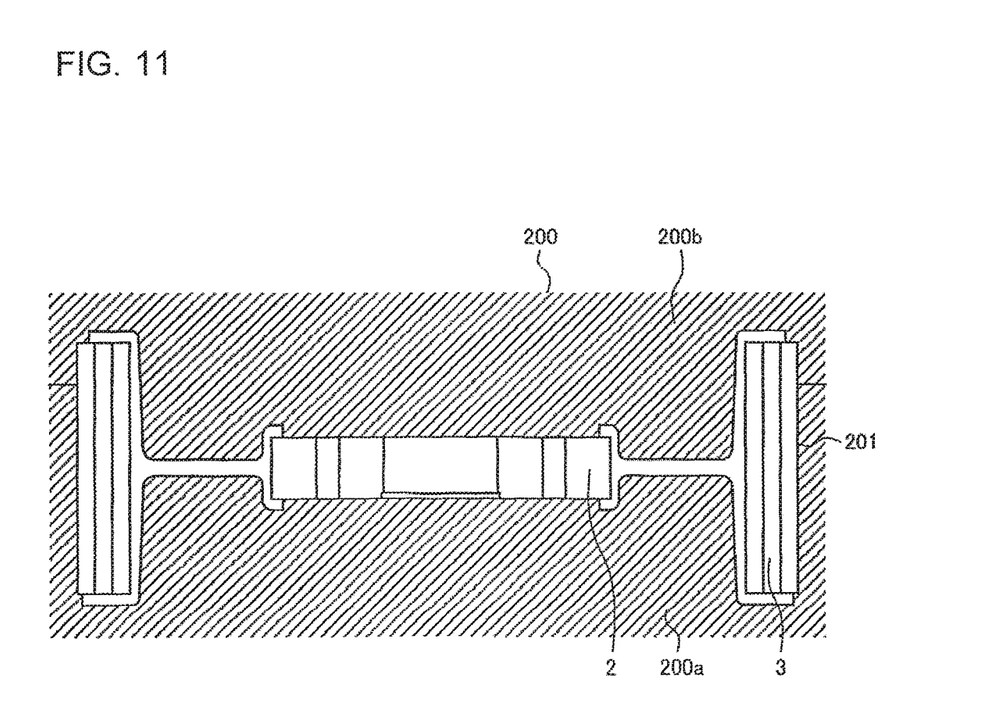
FIG. 11 is a diagram showing a state where the rotor body of the rotor of the motor according to Embodiment of the present invention is molded from resin.

FIG. 11 is a diagram showing a state where the rotor body 1 of the rotor 10 of the motor 100 according to Embodiment of the present invention is molded from resin.

In the molding step S2, an upper mold 200b is put over the lower mold 200a in which the inner core 2 and the outer core 3 formed in an annular shape by connecting the divided cores 3a to each other have been placed, and resin is supplied into the mold 200. The resin forms the coupling member 4. In the mold 200, injection molding is executed.

In the molding step S2, the resin is supplied into the mold 200 in a preset amount corresponding to a deviation in stacking thickness of the divided cores 3a so that the outer core 3 is wholly circumferentially uniform in height in the axial direction of the shaft 11 after the resin has covered both end faces of the outer core 3 in the axial direction. The upper surface of the outer core 3 is partially covered with the resin. The lower surface of the outer core 3 is wholly covered with the resin, excluding a circular columnar support supporting the outer core 3.

Further, the mold 200 has a supply port (not illustrated) through which the resin is supplied into the mold 200. The supply port is located in a part of the mold 200 where the main annular portion 4a of the coupling member 4 is molded. This allows the resin to flow radially inward and outward in a cavity of the mold 200 in which the coupling member 4 is molded.

Figure 12:
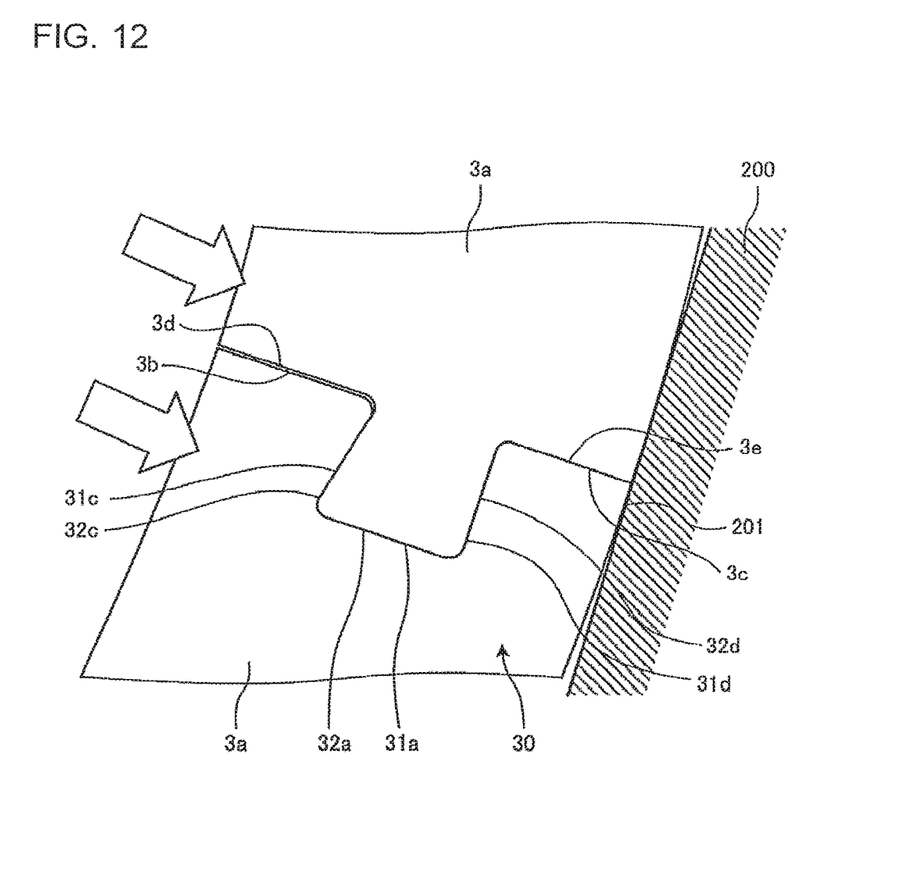
FIG. 12 is an enlarged view of a state during molding of a connection structure via which divided cores of the rotor of the motor according to Embodiment of the present invention are connected to each other.

FIG. 12 is an enlarged view of a state during molding of a connection structure 30 via which divided cores 3a of the rotor 10 of the motor 100 according to Embodiment of the present invention are connected to each other.

As shown in FIG. 12, in the molding step S2, the resin flows from the inside of the outer core 3. Then, as indicated by arrows in FIG. 12, the outer circumferential part of the outer core 3 is pressed against the inner circumferential surface 201 of the mold 200 under resin pressure at which the coupling member 4 is molded from the resin. This causes the resin to flow into a gap between the divided cores 3a that is radially inner than the connection structure 30. Meanwhile, the parts of the divided cores 3a that are radially outer than the connection structure 30 are brought into close contact with each other.

Specifically, differences in dimension are provided to form gaps between the side 31c of the dovetail groove 31 and the side 32c of the salient 32 and between the radially inner ends 3b and 3d than the connection structure 30. For this reason, when the divided cores 3a are pressed together against the inner circumferential surface 201 of the mold 200, the resin pressure at which the coupling member 4 is molded from the resin widens the gaps between the side 31c of the dovetail groove 31 and the side 32c of the salient 32 and between the radially inner ends 3b and 3d than the connection structure 30 so that the resin flows into the gaps.

Meanwhile, dimensions are designated to make complete contact between the side 31d of the dovetail groove 31 and the side 32d of the salient 32 and between the radially outer ends 3c and 3e than the connection structure 30 when the divided cores 3a are pressed together against the inner circumferential surface 201 of the mold 200. This restricts the range of movement to make gapless close contact. For this reason, when the divided cores 3a are pressed together against the inner circumferential surface 201 of the mold 200, the resin pressure at which the coupling member 4 is molded from the resin makes forced close contact between the side 31d of the dovetail groove 31 and the side 32d of the salient 32 and between the radially outer ends 3c and 3e than the connection structure 30. This close-contact state causes the outer core 3 to be formed into an annular shape.

Further, this close-contact state prevents the resin from flowing out from the gap between the divided cores 3a onto the outer circumferential surface of the outer core 3 that faces radially outward.

As mentioned above, by providing each of the divided cores 3a with a connection structure 30, Embodiment makes it possible to correct the outer core 3 into an annular shape while molding the coupling member 4 from resin. That is, Embodiment makes it possible to form the rotor body 1 into a shape with roundness regardless of variation among the divided cores 3a. This makes it possible to give the rotor 10 a stable structure and bring about improvement in productivity and reliability. As a result, this makes it possible to give the rotor 10 and the motor 100 longer lives.

It should be noted that, in general, thermoplastic resin is used as resin for use in the formation of the rotor body 1 by molding or the like. As mentioned above, in a case where the rotor body 1 is applied to an SPM motor or the like to which the permanent magnets 12 are attached, the coupling member 4 may be made of resin such as PBT resin that has such shrinkability as not to pose an impediment to the attachment of the permanent magnets 12. Further, in a case where an emphasis is put on strength, the coupling member 4 may be made of inexpensive resin such as PP (polypropylene). Furthermore, in a case where the rotor 10 with no permanent magnets 12 disposed on the outer circumferential surface of the rotor body 1 is applied to an IPM motor or the like, it is possible to use resin such as thermosetting resin that has a low rate of shrinkage.

In Embodiment, the coupling member 4 is made of resin appropriately selected according to the type of motor 100 to which the rotor 10 is applied. For example, in a case where the rotor 10 is applied to an SPM motor, resin having preferred shrinkability is used. For this reason, even when the resin flows in the mold 200 over the entire surfaces of the end faces of the outer core 3 in the axial direction in which the shaft 11 extends out, a shrinkage of the resin does not affect the outer circumferential surface of the rotor body 1 to which the permanent magnets 12 are attached.

The following describes an air-conditioning apparatus 50 mounted with a motor 100 according to Embodiment 1 and a fixed state of the motor 100.

Figure 13:
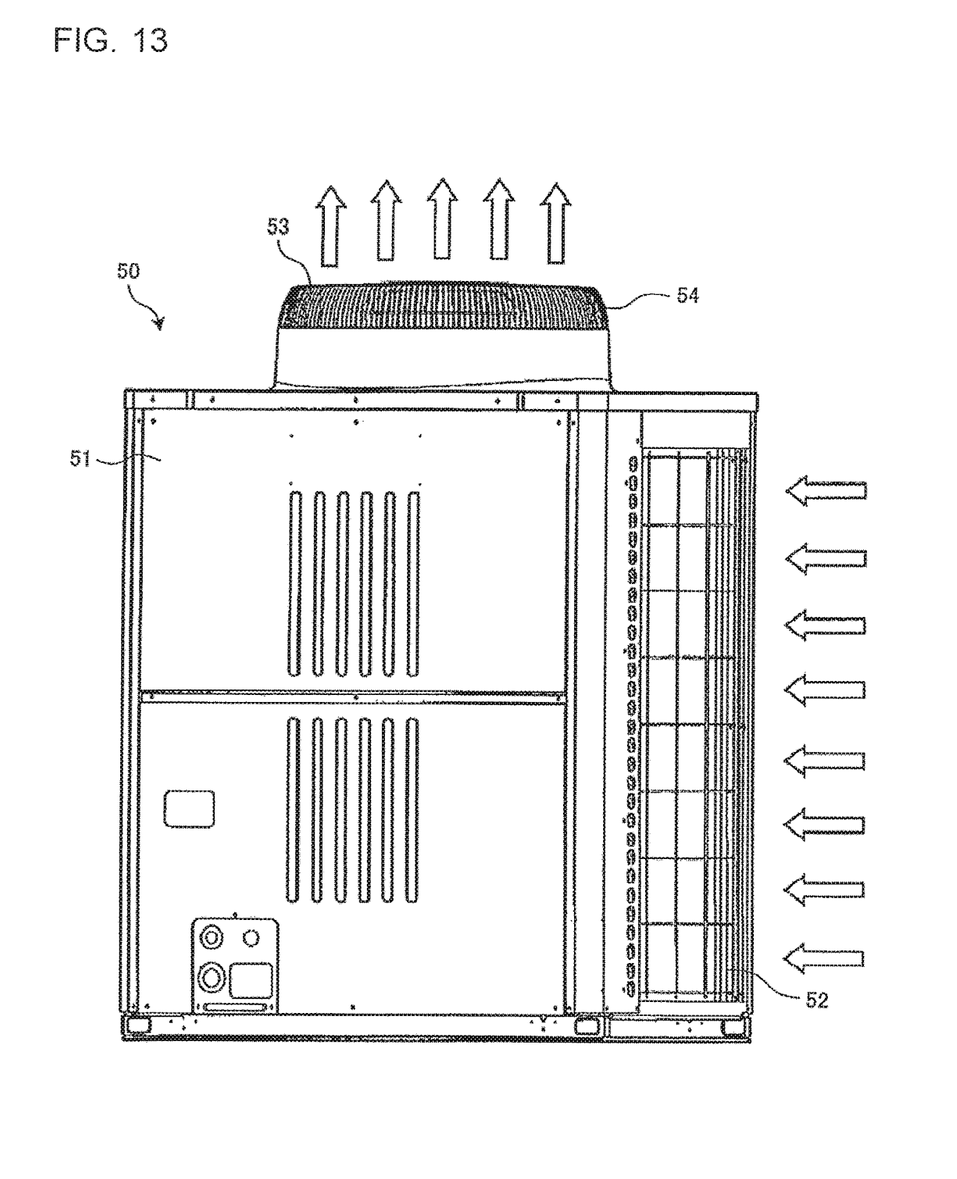
FIG. 13 is a diagram showing the appearance of an air-conditioning apparatus in which a motor according to Embodiment of the present invention is mounted.

FIG. 13 is a diagram showing the appearance of an air-conditioning apparatus 50 in which a motor 100 according to Embodiment of the present invention is mounted.

The air-conditioning apparatus 50 is for example an outdoor unit and includes a motor 100. For this reason, as the motor 100 comes to have a longer life, the apparatus comes to have improved reliability.

As shown in FIG. 13, the air-conditioning apparatus 50 includes a housing 51 formed in a box shape, an air inlet 52 formed by an opening in a side face of the housing 51, a heat exchanger (not illustrated) disposed within the housing 51 so as to extend along the air inlet 52, an air outlet 53 formed by an opening in a top face of the housing 51, and a fan guard 54 ventilatably provided so as to cover the air outlet 53.

Placed inside the fan guard 54 is a fan 55 shown in FIG. 14 below that is driven by the motor 100.

In the air-conditioning apparatus 50 thus configured, rotation of the fan 55 causes air to be sucked in through the air inlet 52 in the side face of the housing 51, pass through the heat exchanger, and form a vertical flow to be blown out as indicated by arrows in FIG. 13 through the air outlet 53 formed in the top part of the housing 51.

Figure 14:
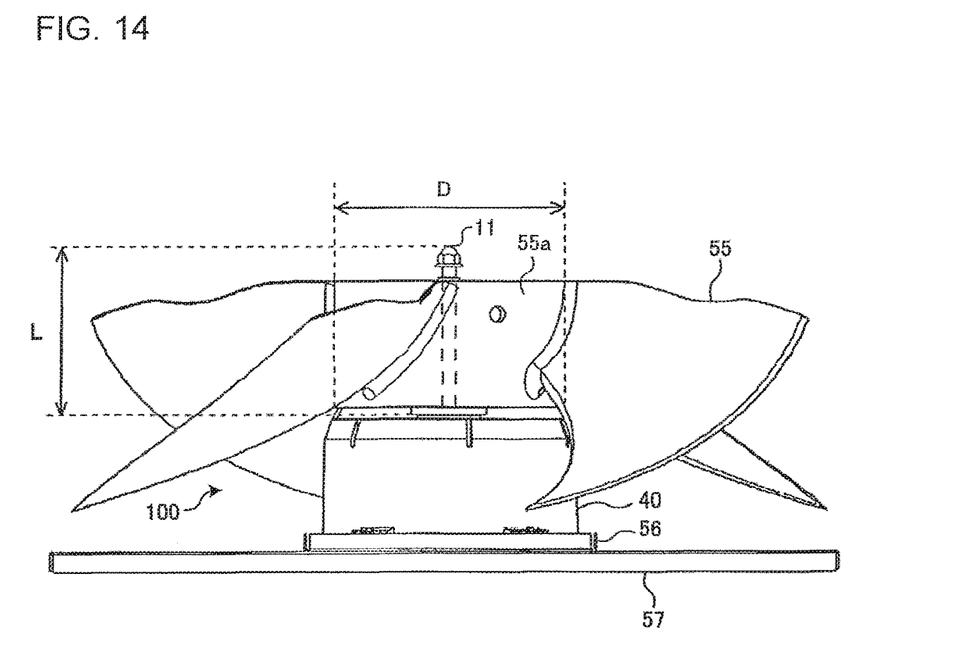
FIG. 14 is a side view of the motor according to Embodiment of the present invention and a fan that is driven by the motor.

FIG. 14 is a side view of the motor 100 according to Embodiment of the present invention and the fan 55 that is driven by the motor 100.

As shown in FIG. 14, the motor 100 is supported by a leg 56 on a supporting member 57 in the air-conditioning apparatus 50. Further, the fan 55 is attached to the shaft 11 of the motor 100.

The supporting member 57 is for example composed of two rails. The motor 100 is placed so that the bottom face touches the supporting member 57 and the shaft 11 faces upward. The fan 55 is attached to the shaft 11 of the motor 100, and the fan 55 is driven by rotation of the rotor 10 of the motor 100.

Note here that the length of the shaft 11 is set so that there is a clearance between the lower end of a blade of the fan 55 and the supporting member 57. In Embodiment, in which the motor 100 is fixedly placed on the supporting member 57, the length L of the shaft 11 can be made shorter than in a case where the central part of the motor 100 is supported, so that axial runout of the fan 55 can be reduced. Further, in Embodiment, the air-conditioning apparatus 50 can bring about improvement in reliability as the motor 100 mounted therein comes to have a longer life.

It should be noted that the motor 100 can be configured such that the diameter of the body shell 40 in a plan view is smaller than the diameter D of a fan boss 55a of the fan 55. This configuration reduces the resistance of a wind blowing from the lower part of the motor 100 to the upper part of the motor 100.

According to Embodiment described above, a rotor 10 includes a shaft 11. The rotor 10 includes an inner core 2 into which the shaft 11 is inserted. The rotor 10 includes an outer core 3 provided on a radially outer side of the inner core 2 and composed of a plurality of divided cores 3a formed by stacking a plurality of thin plate materials and connected in an annular shape. The rotor 10 includes a coupling member 4 made of resin, coupling the inner core 2 and the outer core 3 together, and covering both end faces of the outer core 3 in an axial direction of the shaft 11. The outer core 3 has radially outer parts of the divided cores 3a brought into close contact with each other.

According to this configuration, since the outer core 3 is provided by connecting, into an annular shape, the plurality of divided cores 3a formed by stacking a plurality of thin plate materials, fewer parts remain as remnants. This leads to higher yields and lower costs, resulting in high productivity.

Further, since the coupling member 4 covers both end faces of the outer core 3 in the axial direction of the shaft 11, the surfaces of the divided cores 3a can be uniformly covered. This leads to higher yields, resulting in high productivity.

Furthermore, since the radially outer parts of the divided cores 3a are brought into close contact with each other, permanent magnets 12 can be disposed at equal intervals on the outer core 3 so that the rotor 10 can exhibit the required roundness. Therefore, since the rotor 10 exhibits its roundness, there are no disturbances of the magnetic flux. The absence of disturbances of the magnetic flux leads to balanced magnetic attractive forces that in turn lead to reductions in vibrations, cogging sounds, and the like, resulting in improved reliability.

Further, since the coupling member 4 made of resin couples the inner core 2 and the outer core 3 together, the inner core 2 and the outer core 3 can be insulated by the coupling member 4 made of resin. This prevents electrolytic corrosion between the inner core 2 and the outer core 3, resulting in improved reliability.

All this makes it possible to give the rotor 10 a stable structure and bring about improvement in productivity and reliability.

The outer core 3 has the radially outer parts of the divided cores 3a brought into close contact with each other by the resin having flowed into a gap between radially inner sides of the divided cores 3a.

This configuration makes it possible to, when having molded the coupling member 4 from the resin, press an outer circumferential part of the outer core 3 against an inner circumferential surface 201 of a mold 200 under resin pressure, cause the resin to flow into the gap between the radially inner sides of the divided cores 3a, and thereby bring the radially outer parts of the divided cores 3a into close contact with each other. This brings the radially outer parts of the divided cores 3a into close contact with each other, allowing the permanent magnets 12 to be disposed at equal intervals on the outer core 3 and allowing the rotor 10 to exhibit the required roundness.

The outer core 3 has the radially outer parts of the divided cores 3a brought into close contact with each other in a state where an outer circumferential part of the outer core 3 is pressed against an inner circumferential surface 201 of a mold 200 under resin pressure at which the coupling member 4 was molded from the resin.

This configuration makes it possible to, when molding the coupling member 4 from the resin, press the outer circumferential part of the outer core 3 against the inner circumferential surface 201 of the mold 200 under the resin pressure and thereby bring the radially outer parts of the divided cores 3a into close contact with each other. This brings the radially outer parts of the divided cores 3a into close contact with each other, allowing the permanent magnets 12 to be disposed at equal intervals on the outer core 3 and allowing the rotor 10 to exhibit the required roundness.

The rotor 10 further includes a connection structure 30 via which the divided cores 3a are connected to each other. The outer core 3 has the radially outer parts of the divided cores 3a brought into close contact with each other by the resin having flowed into a gap between the divided cores 3a that is radially inner than the connection structure 30, the radially outer parts being radially outer than the connection structure 30.

This configuration makes it possible to, when having molded the coupling member 4 from the resin, press the outer circumferential part of the outer core 3 against the inner circumferential surface 201 of the mold 200 under the resin pressure, cause the resin to flow into the gap between the divided cores 3a that is radially inner than the connection structure 30, and thereby bring the radially outer parts of the divided cores 3a into close contact with each other, the radially outer parts being radially outer than the connection structure 30. This brings the radially outer parts of the divided cores 3a into close contact with each other, allowing the permanent magnets 12 to be disposed at equal intervals on the outer core 3 and allowing the rotor 10 to exhibit the required roundness.

The connection structure 30 has a dovetail groove 31 and a salient 32 that is fitted into the dovetail groove 31.

This configuration makes it possible to cause the resin to flow into the gap between the divided cores 3a that is radially inner than the connection structure 30 and thereby bring the radially outer parts of the divided cores 3a into close contact with each other, the radially outer parts being radially outer than the connection structure 30.

Further, this makes it harder for the divided cores 3a to be disconnected from each other, making manufacturing easier.

The outer core 3 has an exposed outer circumferential surface on which permanent magnets 12 are disposed.

This configuration can be utilized as the rotor of an SPM motor.

In particular, the permanent magnets 12 are disposed without extending over dividing parts at which the divided cores 3a are connected to each other to constitute the outer core 3. That is, the same number of permanent magnets 12 are disposed on the respective outer circumferential surfaces of the divided cores 3a as the divided cores 3a that constitute the outer core 3.

This configuration makes the number of partitions of the outer core 3 equal to the motor pole number, thus making it possible to reduce the influence of the magnetic flux. Further, this prevents the permanent magnets 12 from being attached at insufficient adhesive strength in the presence of steps on the surfaces of the dividing parts at which the divided cores 3a are connected.

A motor 100 includes the rotor 10 and a stator 20 disposed on a radially outer side of the rotor 10.

This configuration gives the rotor 10 a stable structure and brings about improvement in productivity and reliability, thus making it possible to give the motor 100 a longer life.

An air-conditioning apparatus 50 includes the motor 100, a fan 55 that is driven by the motor 100, and a heat exchanger that exchanges heat between air and refrigerant with a current of air produced by the fan 55.

According to this configuration, as the motor 100 comes to have a longer life, the apparatus comes to have improved reliability.

A method for manufacturing a rotor 10 manufactures a rotor 10 including a shaft 11, an inner core 2 into which the shaft 11 is inserted, an outer core 3 provided on a radially outer side of the inner core 2 and composed of a plurality of divided cores 3a formed by stacking a plurality of thin plate materials and connected in an annular shape, and a coupling member 4 made of resin, coupling the inner core 2 and the outer core 3 together, and covering both end faces of the outer core 3 in an axial direction of the shaft 11. The method for manufacturing a rotor 10 includes a molding step S2 of molding the coupling member 4 from resin. The molding step S2 includes pressing an outer circumferential part of the outer core 3 against an inner circumferential surface 201 of a mold 200 under resin pressure at which to mold the coupling member 4 from the resin and thereby bringing radially outer parts of the divided cores 3a into close contact with each other.

This configuration brings the radially outer parts of the divided cores 3a into close contact with each other, allowing the permanent magnets 12 to be disposed at equal intervals on the outer core 3 and allowing the rotor 10 to exhibit the required roundness.

The outer core 3 has a connection structure 30 via which the divided cores 3a are connected to each other. The method for manufacturing a rotor 10 further includes a connecting step S1 of connecting the divided cores 3a to each other via the connection structure 30. The molding step S2 includes placing, in the mold 200, the outer core 3 formed by connecting the divided cores 3a to each other in the connecting step S1, pressing the outer circumferential part of the outer core 3 against the inner circumferential surface 201 of the mold 200 under the resin pressure at which to mold the coupling member 4 from the resin, causing the resin to flow into a gap between the divided cores 3a that is radially inner than the connection structure 30, and thereby bringing the radially outer parts of the divided cores 3a into close contact with each other, the radially outer parts being radially outer than the connection structure 30.

This configuration brings the radially outer parts of the divided cores 3a into close contact with each other, allowing the permanent magnets 12 to be disposed at equal intervals on the outer core 3 and allowing the rotor 10 to exhibit the required roundness.

The molding step S2 includes supplying the resin into the mold 200 in a preset amount corresponding to a deviation in thickness of the divided cores 3a so that the outer core 3 is uniform in height in the axial direction of the shaft 11 after the resin has covered both end faces of the outer core 3 in the axial direction.

According to this configuration, since the coupling member 4 covers both end faces of the outer core 3 in the axial direction of the shaft 11, the surfaces of the divided cores 3a can be uniformly covered. This holds the height of the rotor 10 constant and leads to higher yields, resulting in high productivity.

It should be noted that Embodiment described above serves as preferred specific examples of a rotor, a motor, an air-conditioning apparatus, and a method for manufacturing a rotor. In the foregoing, there are cases where various technically preferable limitations are applied. The technical scope of the present invention is not limited to these aspects, unless there is a description that limits the present invention otherwise. For example, although, in Embodiment described above, the outer core is composed of ten divided cores, the outer core needs only be formed in at least an annular shape. That is, the outer core may be constituted by connecting any number of divided cores of the same shape or may be constituted by connecting divided cores of different shapes such as partially-separated shapes into an annular shape.

REFERENCE SIGNS LIST 1 rotor body 2 inner core 2a insertion hole 2b lightening hole 3 outer core 3a divided core 3b radially inner end 3c radially outer end 3d radially inner end 3e radially outer end 4 coupling member 4a main annular portion 4b reinforcing rib 10 rotor 11 shaft 12 permanent magnet 20 stator 30 connection structure 31 dovetail groove 31a bottom 31b opening 31c side 31d side 32 salient 32a tip 32b base 32c side 32d side 40 body shell 50 air-conditioning apparatus 51 housing 52 air inlet 53 air outlet 54 fan guard 55 fan 55a fan boss 56 leg 57 supporting member 100 motor 200 mold 200a lower mold 200b upper mold 201 inner circumferential surface

The invention claimed is:

1. A rotor comprising:
    a shaft;
    an inner core into which the shaft is inserted;
    an outer core provided on a radially outer side of the inner core and composed of a plurality of divided cores formed by stacking a plurality of thin plate materials and connected in an annular shape; and
    a coupling member made of resin, coupling the inner core and the outer core together, and covering both end faces of the outer core in an axial direction of the shaft,
    wherein the outer core has radially outer parts of the divided cores being contacted with each other, and a resin is disposed in a gap between radially inner sides of the divided cores.

2. The rotor of claim 1,
    wherein the outer core has the radially outer parts of the divided cores brought into close contact with each other in a state where an outer circumferential part of the outer core is pressed against an inner circumferential surface of a mold under resin pressure at which the coupling member was molded from the resin.

3. The rotor of claim 1, further comprising
    a connection structure via which the divided cores are connected to each other,
    wherein the outer core has the radially outer parts of the divided cores brought into close contact with each other by the resin disposed in a gap between the divided cores that is radially inner than the connection structure, the radially outer parts being radially outer than the connection structure.

4. The rotor of claim 3,
    wherein the connection structure has a dovetail groove and a salient that is fitted into the dovetail groove.

5. The rotor of claim 1,
    wherein the outer core has an exposed outer circumferential surface on which permanent magnets are disposed.

6. A motor comprising:
    the rotor of claim 1; and
    a stator disposed on a radially outer side of the rotor.

7. An air-conditioning apparatus comprising:
    the motor of claim 6;
    a fan configured to be driven by the motor; and
    a heat exchanger configured to exchange heat between air and refrigerant with a current of air produced by the fan.

8. A method for manufacturing a rotor including a shaft, an inner core into which the shaft is inserted, an outer core provided on a radially outer side of the inner core and composed of a plurality of divided cores formed by stacking a plurality of thin plate materials and connected in an annular shape, and a coupling member made of resin, coupling the inner core and the outer core together, and covering both end faces of the outer core in an axial direction of the shaft,
    the method comprising molding the coupling member from resin,
    wherein the molding includes pressing an outer circumferential part of the outer core against an inner circumferential surface of a mold under resin pressure at which to mold the coupling member from the resin and thereby bringing radially outer parts of the divided cores to be contacted with each other.

9. The method of claim 8,
    wherein the outer core has a connection structure via which the divided cores are connected to each other,
    the method further comprising connecting the divided cores to each other via the connection structure,
    wherein the molding includes placing, in the mold, the outer core formed by connecting the divided cores to each other in the connecting step, pressing the outer circumferential part of the outer core against the inner circumferential surface of the mold under the resin pressure at which to mold the coupling member from the resin, causing the resin to flow into a gap between the divided cores that is radially inner than the connection structure, and thereby bringing the radially outer parts of the divided cores into close contact with each other, the radially outer parts being radially outer than the connection structure.

10. The method of claim 8,
    wherein the molding includes supplying the resin into the mold in a preset amount corresponding to a deviation in thickness of the divided cores so that the outer core is uniform in height in the axial direction of the shaft after the resin has covered both end faces of the outer core in the axial direction.

\* \* \* \* \*